United States Patent [19]

Adamson et al.

[11] Patent Number: 4,991,046
[45] Date of Patent: Feb. 5, 1991

[54] SELF ALIGNED LAPPING GUIDE FOR INDUCTIVE RECORD HEADS

[75] Inventors: Steven J. Adamson, Poway; Harry S. Edelman, La Jolla, both of Calif.

[73] Assignee: Eastman Kodak Company, Rochester, N.Y.

[21] Appl. No.: 353,305

[22] Filed: May 17, 1989

[51] Int. Cl.⁵ .................... G11B 5/187; G11B 5/127
[52] U.S. Cl. ................................. 360/122; 360/126; 360/119
[58] Field of Search ............... 360/119, 120, 126, 121, 360/127, 122, 110

[56] References Cited

U.S. PATENT DOCUMENTS

| | | | |
|---|---|---|---|
| 4,182,643 | 1/1980 | Cableron, Jr. et al. | 360/121 |
| 4,423,451 | 12/1983 | Chi | 360/121 |
| 4,727,643 | 3/1988 | Schewe et al. | 360/122 |
| 4,759,118 | 7/1988 | Nakashima | 360/122 |
| 4,861,398 | 8/1989 | Eukuoka et al. | 360/126 |

Primary Examiner—John H. Wolff
Assistant Examiner—Alfonso Garcia
Attorney, Agent, or Firm—Robert F. Cody

[57] ABSTRACT

A technique for defining the gap depth of a magnetic head utilizes side-by-side knife edges which point in generally opposite directions, and define thereby a reference gap depth. The resistance of a conductive layer beneath the structure which defines one knife edge is the analog of the gap depth.

10 Claims, 7 Drawing Sheets

SELF ALIGNED LAPPING GUIDE FOR INDUCTIVE RECORD HEADS

BACKGROUND OF THE INVENTION

1. Field of the Invention

This invention relates in general to a thin-film magnetic head of the inductive type, and in particular to such a head which comprises a lapping and/or wear guide for precisely indicating the gap depth thereof in relation to a zero throat height or gap depth.

The invention as well as the prior art will be described with reference to the figures of which FIG. 1 is a cross section of a prior art head of the type improved by means of the invention, FIG. 2 is a diagram useful in describing a problem associated with the prior art head of FIG. 1, FIGS. 3, 3A, 3B are diagrams useful in describing the concept of the invention, FIGS. 4–7 are cross sectional views illustrating the practice of the invention, FIG. 8 is a schematic diagram further illustrating the practice of the invention, and FIG. 9 is a diagram illustrating a series of plan views indicating the formation of a resistive lapping/wear guide layer determinative of the degree of head lapping/wear.

2. Description Relative to the Prior Art

Referring to the cross sectional view of FIG. 1, a prior art thin-film head is typically formed by depositing an electrically non-conductive layer 10 atop a substrate 12. Atop the layer 10, a layer 14 of magnetic material, e.g. permalloy, is deposited, after which an electrically insulating layer 16 is formed over the layer 14. Then, a coil structure 18 is formed atop the layer 16.

With a non-magnetic gapping layer 20 in place, a layer 22 of electrically non-conductive photoresist is deposited over and about the coil structure 18; and then a magnetic coating 24 is formed over the photoresist. The magnetic coating 24 is suitably shaped (pole No. 1) and, together with the gapping layer 20, and the magnetic layer 14 (pole No. 2), forms a coil-wound gapped magnetic head.

The photoresist 22, and the cross-sectional shape thereof, is of special interest: To allow for continuity of the pole No. 2 from the head front gap ($g_f$) to the head back gap ($g_b$), the photoresist must incline at f and b, such being achieved, typically, by heating the photoresist at a certain temperature, and for a given duration. While such processing achieves one desired objective, viz, that of suitably inclining the photoresist, it does so at the expense of zero-gap-depth ($g_o$) definition. This may be appreciated from the FIG. 2 which shows that a zero-gap-depth $g_o$ is different from the gap depth ($g_o+\Delta_T$) associated with a crease c. Indeed, as is clearly shown by dashed lines 24', the gap depth associated with the crease is variable as a function of the thickness of the pole No. 2 layer 24, i.e. $g_o+\Delta'_T$.

It will be appriciated that head manufacturers are often requested to provide a head having a certain throat height or gap depth, e.g. one having a gap depth of, say, 1 micron ±0.5 microns. Given that such tiny dimensions are called for, it is incumbent that the $g_o$ depth depicted in FIG. 2 be the reference against which all gap depths are defined, for to do otherwise would result in the delivery of imprecisely defined product.

SUMMARY OF THE INVENTION

To reconcile the above-described problem and thereby assure precise location for the $g_0$ reference gap depth, the invention provides a complementary structure, sidewise of the structure 22, which is formed at the same time as the structure 22, and by the same process therefor. To appreciate this matter, reference should be had to FIG. 3 which (while being merely a graphical depiction useful to an understanding of the invention) shows two side-by-side knife-edge structures 22' and 30'. Both structures, which sit atop a substrate 12', are formed at the same time, and by the sames process, thereby creating what may be considered the projection of a V-like groove that precisely identifies, at its apex, a reference $g'_0$. (See also FIG. 3A.) As will be appreciated later, the knife-edge structure 30' covers and serves to define dimensions of an underlying electrically conductive layer the edge of which precisely coincides with the reference gap depth $g_0$. Given that the structure of FIG. 3 is lapped in the direction of an arrow 32, the resistance of the underlying layer gradually increases (to infinity, at $g_0$), and such resistance (which is measurable) is an accurate analog of the depth of the head gap.

DETAILED DESCRIPTION

Figure 1:
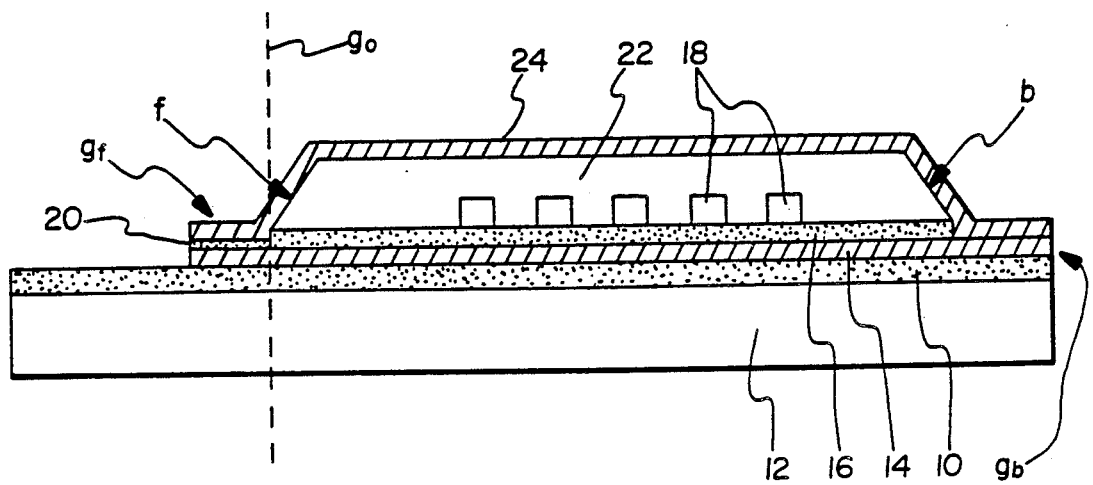
Figure 2:
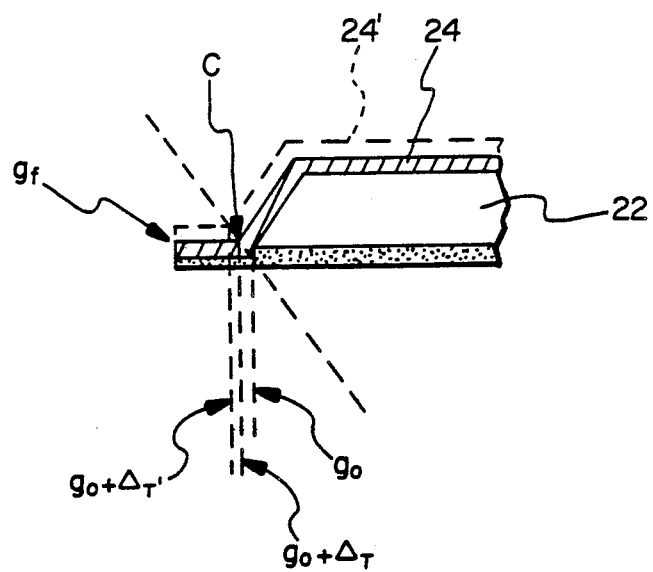
Figure 3:
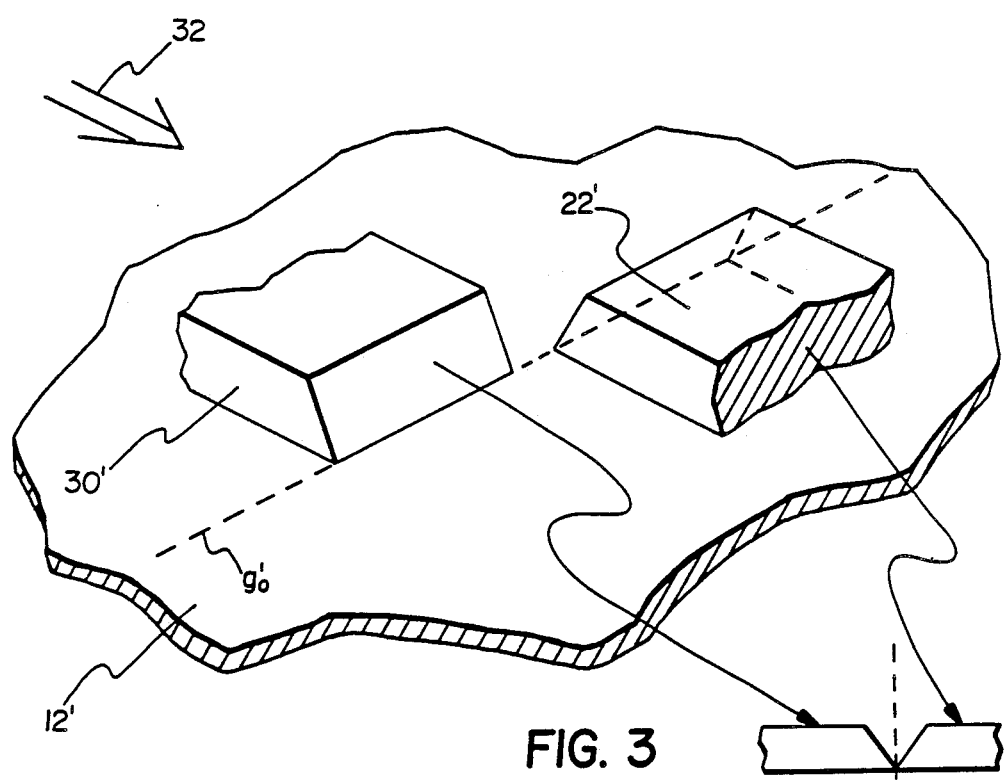
Figure 3A:
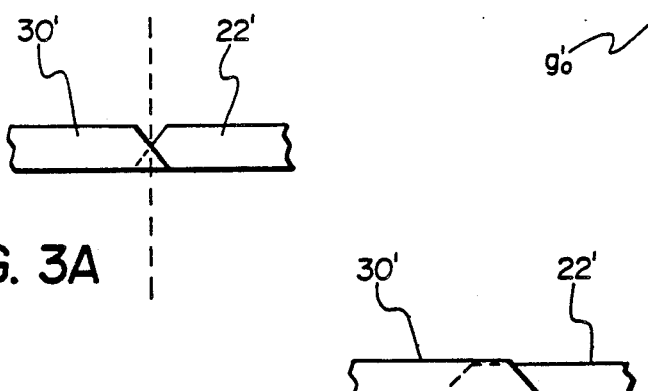
Figure 3B:
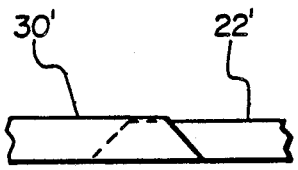
Figure 4:
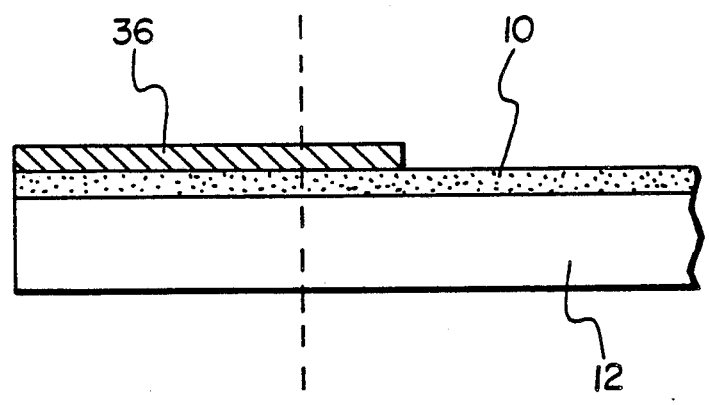
Figure 5:
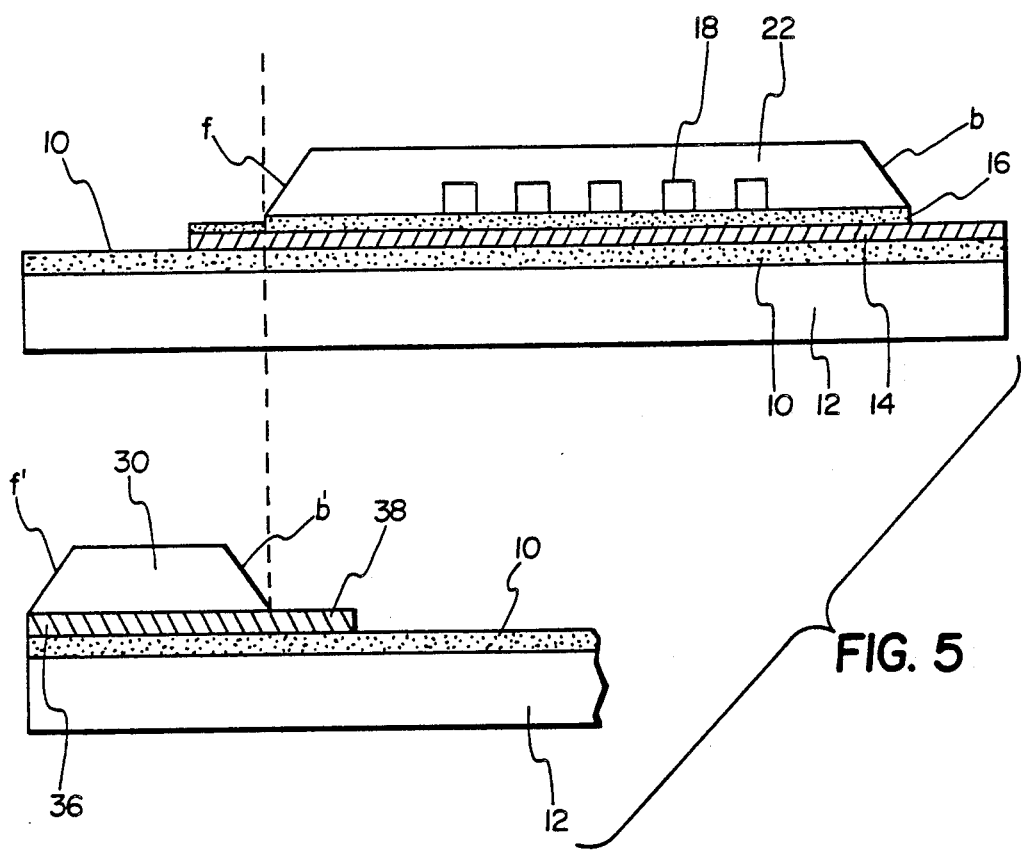
Figure 6:
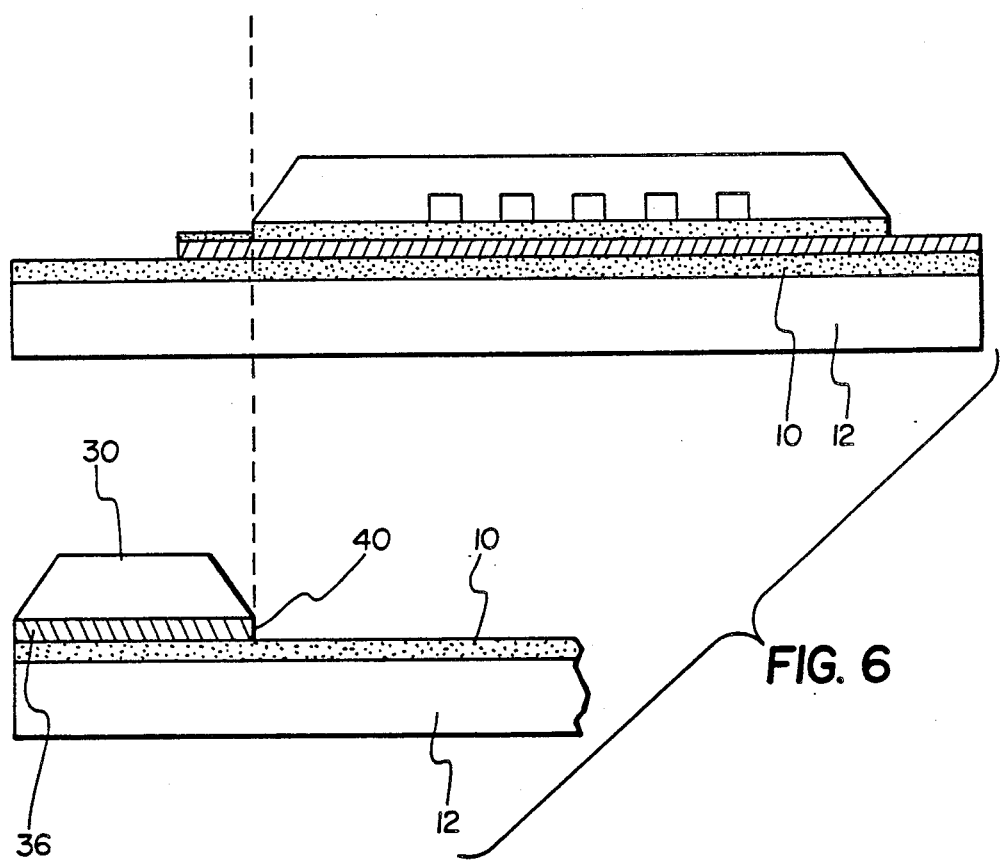

With the above reference to FIG. 3 in mind, reference should now be had to the showing of FIG. 4 which indicates the application of an electrically conductive layer 36 to the electrically non-conductive layer 10 on the substrate 12, the location of the layer 36 being sidewise of the head depicted in FIG. 1. Then, after suitably forming the structures 14, 16, 18 as discussed above, an electrically non-conductive photoresist layer 30 is applied atop the electrically conductive layer 36 at the same time that the layer 22 is applied over the coil structure 18. The two photoresist layers 22, 30 are then simultaneously processed and cured identically, whereby the desired inclines f, f', b, b' are formed (FIG. 5) to create the aforesaid projectable V-like groove that defines a zero gap depth reference $g_0$. Thereafter, the exposed part 38 of the electrically conductive layer 36 is etched away to define (FIG. 6) a precise gap-depth-defining edge 40 for the layer 36. With the structure of FIG. 6 so formed, the layer 24 corresponding to head pole No. 1 is, pursuant to the discussion above, deposited, and shaped, as desired. See FIG. 7.

Figure 7:
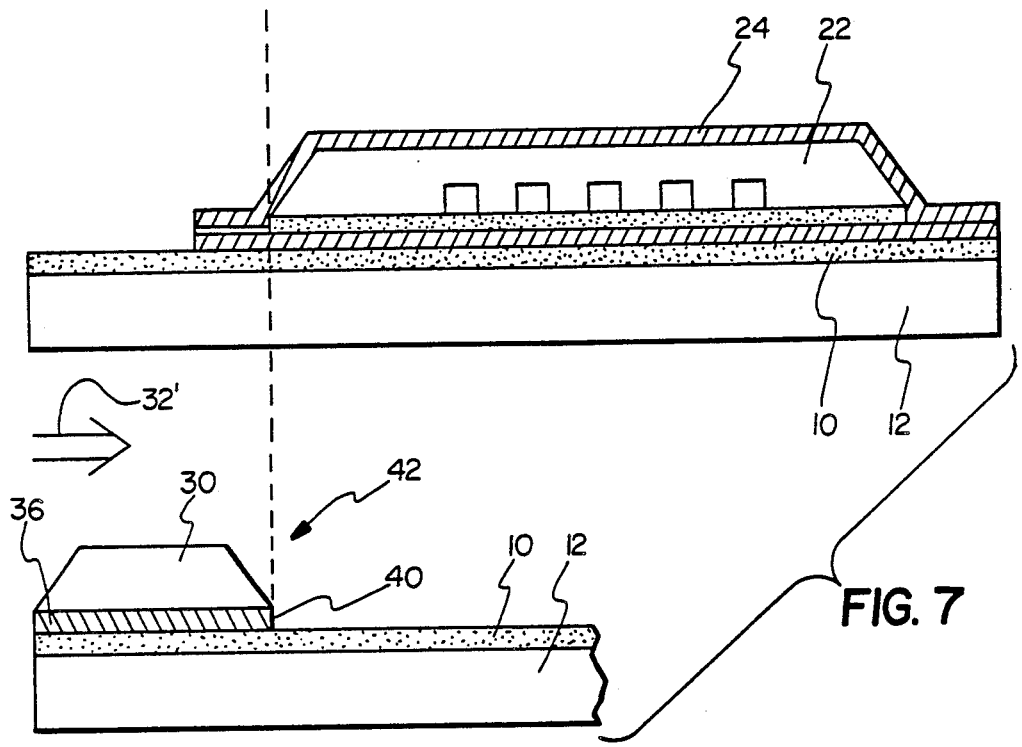
Figure 8:
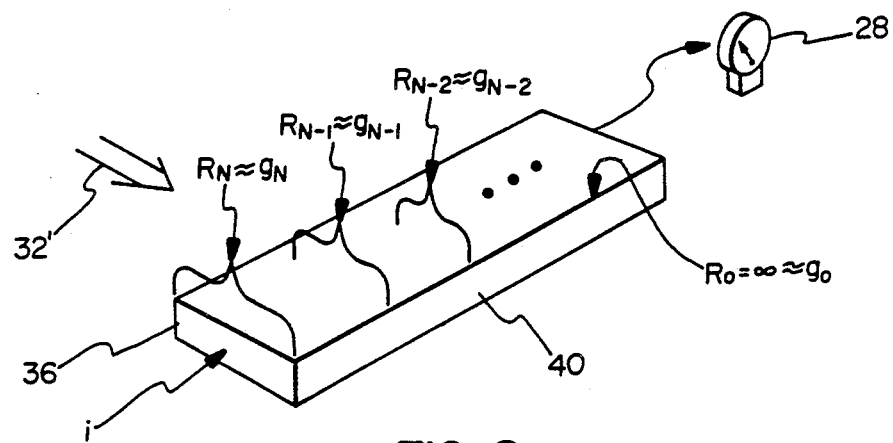

To provide the thin-film head of FIG. 7 with a precise gap depth, the head, and its complementary guide structure 40, are lapped in the direction of the arrow 32' until a gap depth corresponding to a given measureable (48) resistance is achieved. (Certainly, at a gap depth of zero, when for example the head is totally worn out, the resistance goes to infinity.) See FIG. 8.

Figure 9:
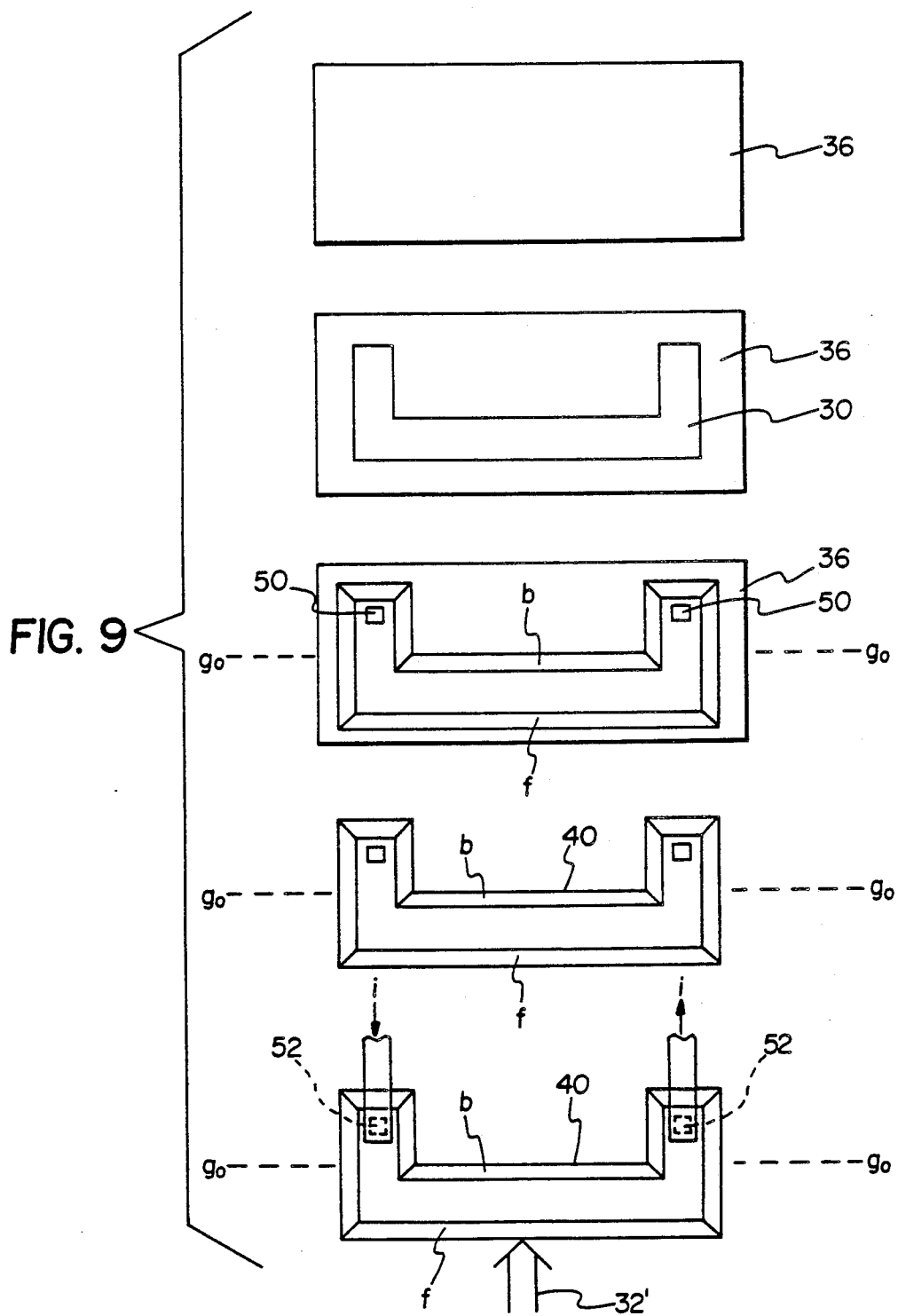

In forming the reference gap depth defining layer 36, care is taken to assure that the layer 36 does not open-circuit until the exact moment that lapping/wear reaches a point corresponding precisely to a gap depth equal to the reference gap depth $g_0$. To this end (see FIG. 9), the photoresist layer 30 formed atop the electrically conductive layer 36 is photo-processed to a U-shape. After processing to form the inclines f, b, and contact opening 50, the electrically conductive layer 36 is etched away, thereby providing the edge 40.

Leads 52 are brought to the underlying layer 36 via the contact openings 50. Such being the case, lapping (32') to the $g_0$ reference gap depth does not break the measuring circuit (i) until such reference gap depth g₀ is actually reached.

The invention has been described in detail with particular reference to a presently preferred embodiment, but it will be understood that variations and modifications can be effected within the spirit and scope of the invention. For example it will be appreciated that variations in the order of applying the various layers described herein may be according to other practices.

What is claimed is:

1. In a thin-film inductive magnetic head structure of the type that comprises
   A. a substrate
   B. first and second layers on said substrate and forming first and second poles spaced apart to define a transducer gap therebetween, and
   C. first non-magnetic layer means that supports the first of said magnetic pole layers, said non-magnetic layer means being inclined toward, and in the vicinity of, said transducer gap, the improvement of a complementary structure to the side of said head structure, said complementary structure comprising
      a. a layer of electrically conductive material and
      b. second non-magnetic, non-electrically conducting, layer means disposed over said layer of electrically conductive material, said second non-magnetic, non-electrically conducting layer means being so inclined toward said transducer gap that it, when projected, forms with a projection of the incline of said first non-magnetic layer means, a V-like groove, the apex of which coincides with a gap depth defining edge of said layer of electrically conductive material, whereby as said complementary structure is worn away, as by lapping or wear, the conductivity of said layer of conductive material correspondes as an accurate analog of the depth of said gap.

2. The improvement of claim 1 further comprising electrical lead means for applying an electrical signal to said layer of electrically conductive material.

3. The improvement of claim 2 wherein said first and second non-magnetic layer means are of substantially the same thickness and of substantially the same composition.

4. The improvement of claim 1 wherein said first and second non-magnetic layer means are of substantially the same thickness and of substantially the same composition.

5. The improvement of claim 4 wherein said layer of electrically conductive material is so shaped that electrical continuity of said layer is interrupted only when said layer is lapped or worn to a gap depth coinciding with said gap depth defining edge of said layer of electrically conductive material.

6. The improvement of claim 1 wherein said layer of electrically conductive material is so shaped that electrical continuity of said layer is interrupted only when said layer is lapped or worn to a gap depth coinciding with said gap depth defining edge of said layer of electrically conductive material.

7. In a thin-film head of the inductive type, said head comprising
   A. a substrate
   B. first and second layers on said substrate and forming first and second magnetic poles spaced apart to define therebetween a transducer gap, and
   C. first generally planar non-magnetic means for supporting said first magnetic pole layer, and having a tapered edge that slopes one way toward said transducer gap,
   the improvement of a wear-guide structure disposed to a side of said thin-film head, said wear guide structure comprising
      a. a layer of electrically conductive material, and
      b. second generally planar non-magnetic electrically insulating means overlaying said layer of electrically conductive material, said second generally planar means having a tapered edge that slopes in an opposite way toward said transducer gap, the planes of said edges being such that they intersect at a line that is related positionally to a reference edge of said layer of electrically conductive material, whereby as said second generally planar non-magnetic electrically insulating means is lapped or worn toward said reference edge the resistance of said layer of electrically conductive material provides a measure of the depth of said transducer gap.

8. The improvement of claim 7 further comprising electrical lead means for applying an electrical signal to said layer of electrically conductive material.

9. The improvement of claim 7 wherein said generally planar means are of substantially the same thickness and composition.

10. The improvement of claim 7 wherein said layer of electrically conductive material is so shaped that electrical continuity of the layer is interrupted only when said layer is lapped or worn through a gap depth coinciding with the reference edge of said layer of electrically conductive material.

* * * * *